United States Patent [19]
Kärnä et al.

[11] Patent Number: 5,128,221
[45] Date of Patent: Jul. 7, 1992

[54] STORAGE BATTERY

[75] Inventors: Toivo Kärnä; Jukka-Pekka Nieminen; Asko Maisti, all of Porvoo; Ahti Kemppi, Järvelä; Esko Savolainen, Hollola, all of Finland

[73] Assignee: Neste Oy, Finland

[21] Appl. No.: 421,239

[22] Filed: Oct. 13, 1989

[51] Int. Cl.[5] .............................................. H01M 2/24
[52] U.S. Cl. ...................................... 429/158; 429/159
[58] Field of Search ................................ 429/158, 159

[56] References Cited

U.S. PATENT DOCUMENTS

| | | | |
|---|---|---|---|
| 688,291 | 12/1901 | Buckley | 429/158 |
| 1,542,911 | 6/1925 | Rider | 429/159 X |
| 3,553,020 | 1/1971 | Corbin | 429/159 X |
| 4,169,918 | 10/1979 | Moore | 429/159 X |
| 4,383,011 | 5/1983 | McClelland | 429/158 X |

*Primary Examiner*—Stephen J. Kalafut
*Attorney, Agent, or Firm*—Steinberg & Raskin

[57] ABSTRACT

A storage battery (10) comprises several cells (1) enclosed within a housing, each cell containing electrolyte and plates coated with positive mass, negative mass, and positive and negative mass on different sections thereof. The cells are separated from each other with separator plates (14), and the requisite electrically conducting connectors are provided for connecting the plates and/or cells. Each cell (11) contains positive and negative plates (12,13,15). Each cell (11) is packed in an individual electrically insulating housing (16) so that merely the ends (12a,13a) of the plates (12,13) need to be electrically interconnected, respectively. The ends (12b, 13b) of the plates (12,13) are connected to the terminals (17,18) which emerge from the housing (16) to be electrically connected. For providing electrical conductivity, the spaces between the cells (11) and the end walls of the outer cells (11) are made electrically conductive with an electricity conduction joint (19).

4 Claims, 1 Drawing Sheet

STORAGE BATTERY

BACKGROUND OF THE INVENTION

The present invention relates to a storage battery comprising a plurality of cells enclosed within a housing, each cell containing electrolyte and plates coated with positive or negative active mass and separated by separator plates, and the requisite electrical connectors interconnecting the plates and/or cells.

Conventional storage batteries made from lead are in general composed of plates enclosed within a cell and immersed in electrolyte. In the cell there is a conducting part conveying the current, a plate frame produced from lead or lead alloy, and active mass which, in general, is pasted in the plate frames. The sides of the plate frames are provided with lugs by which they are soldered to leaden current rails, which in turn are soldered to one another through partitions of the cells.

When discharging the storage battery at high currents, the resistance of the plate frames limits the operation of the storage battery in that the active mass only in the vicinity of the plate lugs is efficiently used. For assuring an adequate the current flow, large quantities of lead have to be placed in the plate frames, which increases the weight of the storage battery. In addition, storage battery housings are used in conventional storage batteries in which the partitions between the cells are used. Not many conductors can be transmitted through the partitions to conduct current from one cell to another. A deep storage battery housing with these partitions is in itself an expensive plastic part which is difficult to produce.

Also, there are storage battery designs which deviate from the conventional one, such that part of the electrodes have been constructed to be bipolar. The positive and negative active masses of the adjacent cells are pasted on the same plate frame, which at the center point has been engaged to a plastic frame in conjunction with injection molding. The plastic frames have been soldered to one another with ultrasonic waves so that the partitions of the cells and, at the same time, the entire storage battery become well sealed. An advantage of this storage battery its small internal resistance and uniform use of active material, which is a consequence of the contact from one cell to another, the contact being distributed uniformly in the area of the entire partition of the cell. One drawback is that a very great number of joints must be made by soldering, which increases the production costs of the storage battery.

Known in the art are also the so-called recombination storage batteries (see e.g. EP 01 07 976) in which the plates containing the positive and negative mass of the adjacent cells have been connected with bridging pieces. The bridging pieces may, in fact, be composed of projections connecting plate parts belonging to adjacent cells. In this storage battery, between the plate stacks constituting the adjacent cells there are no sealed partitions but merely an air gap. The structure is workable only in the instance in which the electrolyte has been absorbed into the separator plates and active masses. A drawback is, for instance, that leakage current flows on the surface of the conductors along the electrolyte diaphragm, the disadvantage becoming greater, the broader the connecting pieces between the plates. Also, the flow distribution is partly uneven because all of the current that flows must pass through the above-noted projections.

SUMMARY OF THE INVENTION

The primary object of the present invention is to provide a storage battery which enables production of the cells of a storage battery in the simplest manner possible. A more detailed goal of the invention is to provide a storage battery in which the mass formulation of the plates with an active mass is simpler. One more goal is to provide a storage battery which enables the simplification of plate stacking.

The objects of the invention are achieved with a storage battery which is mainly characterized in that each cell contains positive and negative plates, and each cell is packed within an individual electrically insulating housing so that only the ends of the plates need to be used to connect electrically to one another. The respective ends of the plates to be connected to the terminals emerge out of the housing to be electrically connected. To provide electrical conductivity, the spaces between the cells and the end walls of the outer cells are made to be electrically conductive.

With the storage battery of the invention, numerous remarkable advantages are achieved. As taught by the invention, each voltage step in the storage battery of the invention is packed within an electrically insulating housing of its own. Only the conductors enter through the walls of the housing. Conductivity as well as the voltage between the terminals is provided by the space between the said boxes being filled with an electrically conducting mass, such as a solution or metal, or in an equivalent way. The design of the invention enables the essential elongation and simpler stacking of the manufactured series of the storage battery cells.

In addition, in the design of the invention, the mass formation of the plates is considerably simpler. Since in the storage battery of the invention, the plates of the same signs and placed in the same cell are interconnected, in the design of the invention also the differential voltages between the plates of the same sign become compensated, thus differing from the conventional bipolar storage battery disclosed e.g. in the Finnish Patent Application No. 855096.

BRIEF DESCRIPTION OF THE DRAWING

The invention is described in detail referring to an advantageous embodiment of the invention depicted in the figures of the accompanying drawing, to which, however the invention is not intended to be exclusively confined, wherein.

DETAILED DESCRIPTION

Figure 1:
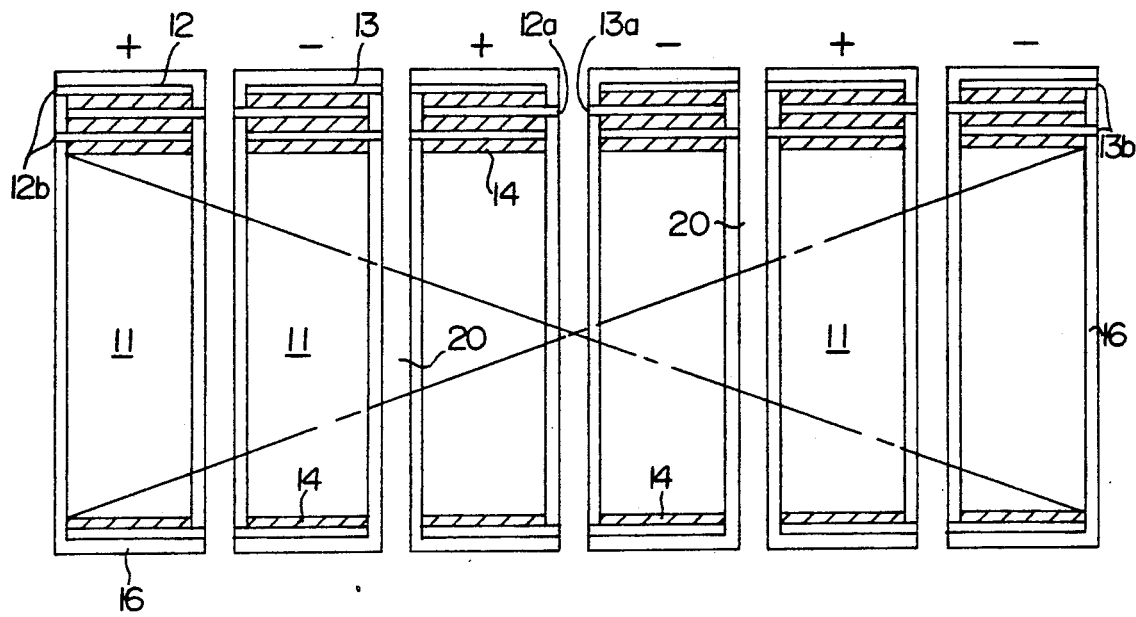
FIG. 1, presents the cells of the invention packed in their housing in schematic top view.
Figure 2:
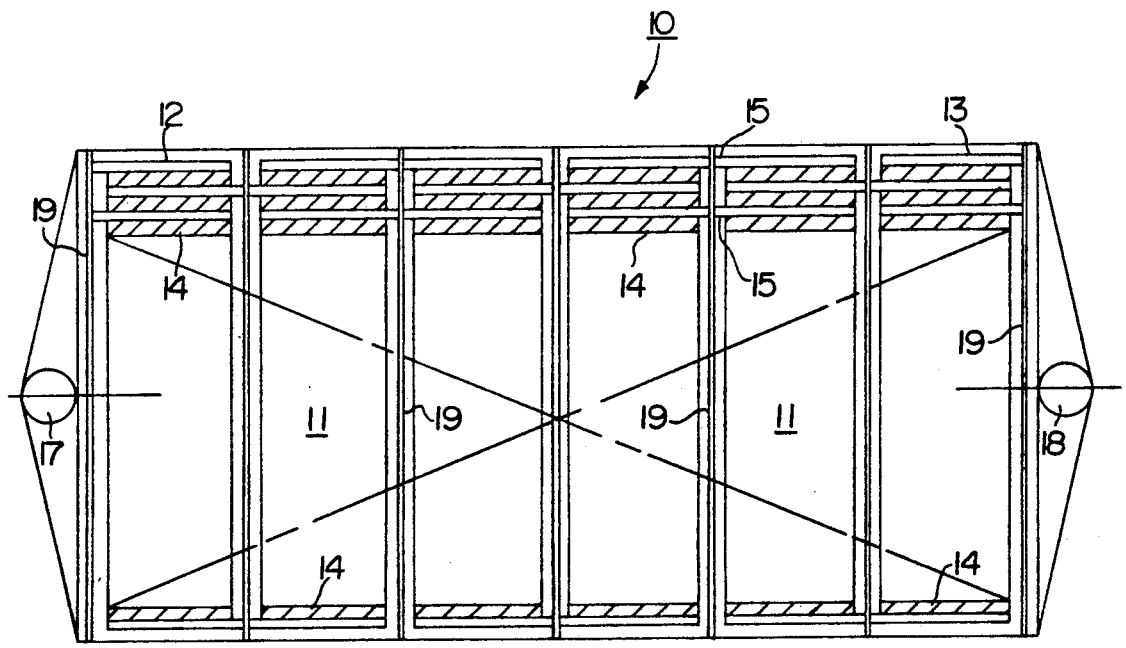
FIG. 2 presents the completed storage battery composed of the cells of the invention in schematic top view.

In the embodiment of FIGS. 1 and 2, the storage battery of the invention is in general indicated with reference numeral 10. In FIGS. 1 and 2 there is shown a 12 V storage battery composed of six cells 11. As taught by the basic idea of the invention, each cell 11 is packed in an individual electrically insulating housing 16. Each cell 11 includes plates 12 coated with positive active mass and plates 13 coated with negative active mass. The plate in each cell are separated by separator plates 14. Only the ends 12a and 13a of the plates 12 and 13 are to be interconnected electrically, respectively. The ends 12b and 13b of the plates 12 and 13 are to be connected to the terminals 17 and 18 which emerge through the wall of the housing 16.

The spaces 20 between the cells 11 are advantageously filled with an electrically conducting mass, such as with a solution or metal, or other electricity conducting material. Thereby, the ends 12a and 13a of the plates 12 and 13 are interconnected electrically. Also, plates 15 corresponding to conventional bipolar plates are formed. Respectively, the ends 12b of the plates 12 are connected electrically to the positive terminal 17 and the ends 13b of the plates 13 are connected to the negative terminal 18. As is best seen in FIG. 2, the end walls of the outer cells 11 are provided so as to be electricity conductive. In FIG. 2, the electricity conducting joint is indicated by reference numeral 19.

The invention can be practiced independently of the production manner of the electricity conducting joint 19.

In the foregoing is presented only the principal design of the invention, and it may occur to a person skilled in the art that modifications may be accomplished therein within the scope of the inventive idea presented in the claims below.

We claim:

1. A storage battery comprising:

a plurality of respective insulating housings, each enclosing a cell;

a pair of battery terminals respectively located adjacent to the two end cells of the plurality of cells; and wherein each cell comprises an electrolyte, plates coated with active mass of positive or negative type, and separator plates which separate the plates coated with the active mass;

the battery further comprises connectors which electrically interconnect said plates and said cells;

wherein, in each of said cells, the plates which are coated with the active mass include both positive and negative plates;

each cell being packed into a separate housing of said respective insulating housings such that certain of said plates within said cells have ends which extend through their said separate housing to electrically connect with ends of respective plates within an adjacent cell which also extend through their said separate housing, and certain other of said plates within said cells have ends which extend through their said separate housing to respectively electrically interconnect with one of said battery terminals; and said battery further comprises a plurality of electrically conductive joints respectively located between adjacent cells, and adjacent to the end walls of the outer cells to provide electrical conductivity between adjacent ones of said cells and to provide electrical conductivity between said end cells and said battery terminals, by respectively contacting said plates which extend through said housings, and said terminals.

2. A storage battery according to claim 1 wherein said electrically conductive joints comprise an electrically conducting material disposed in said space.

3. A storage battery according to claim 2 wherein said electrically conductive material is a solution.

4. A storage battery according to claim 2 wherein said electrically material is a metal.

* * * * *